United States Patent
Katayama

(10) Patent No.: US 10,457,224 B2
(45) Date of Patent: Oct. 29, 2019

(54) VEHICLE BODY STRUCTURE AND ORNAMENTAL MEMBER

(71) Applicant: HONDA MOTOR CO., LTD., Tokyo (JP)

(72) Inventor: Yoichi Katayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/813,318

(22) Filed: Nov. 15, 2017

(65) Prior Publication Data

US 2018/0154844 A1 Jun. 7, 2018

(30) Foreign Application Priority Data

Dec. 6, 2016 (JP) .................................. 2016-237075

(51) Int. Cl.
*B60R 13/04* (2006.01)
*B60R 13/06* (2006.01)
*B60J 10/86* (2016.01)

(52) U.S. Cl.
CPC ............. *B60R 13/043* (2013.01); *B60J 10/86* (2016.02); *B60R 13/04* (2013.01); *B60R 13/06* (2013.01)

(58) Field of Classification Search
CPC ......... B60R 13/02; B60R 13/04; B60R 13/06; B60R 13/043; B60J 10/86
USPC ....... 296/1.08, 146.9; 293/128; 49/460, 462; 428/31
See application file for complete search history.

(56) References Cited

U.S. PATENT DOCUMENTS

| | | | | |
|---|---|---|---|---|
| 4,926,610 A | * | 5/1990 | Jackson | B60R 13/04 293/120 |
| 4,947,585 A | * | 8/1990 | Guetle, Jr. | E06B 3/88 49/462 |
| 6,659,536 B1 | * | 12/2003 | Chamberlain | B60J 5/0416 296/146.5 |
| 6,886,874 B2 | * | 5/2005 | Abe | B60R 13/00 296/1.08 |
| 7,168,208 B2 | * | 1/2007 | Ward | B60J 5/0402 206/453 |
| 8,132,847 B2 | * | 3/2012 | Kimura | B60R 13/04 296/146.1 |
| 9,168,813 B2 | | 10/2015 | Kasuya et al. | |
| 2011/0012388 A1 | * | 1/2011 | Iida | B60R 13/04 296/146.9 |

FOREIGN PATENT DOCUMENTS

DE 102014012476 A1 * 7/2015 .............. B60J 10/86
JP 2012-218648 A 11/2012

\* cited by examiner

*Primary Examiner* — Dennis H Pedder
(74) *Attorney, Agent, or Firm* — Thomas | Horstemeyer, LLP

(57) ABSTRACT

A vehicle body structure including an ornamental member attached to an outer surface of an outer edge portion of a door, wherein the ornamental member includes an attachment portion pasted to the outer surface by a pasting unit, and a parallel surface that extends from the attachment portion outward with respect to the outer edge portion and is parallel to the outer surface.

6 Claims, 4 Drawing Sheets

US 10,457,224 B2

VEHICLE BODY STRUCTURE AND ORNAMENTAL MEMBER

CROSS-REFERENCE TO RELATED APPLICATION

This application is based upon and claims the benefit of priority from the prior Japanese Patent Application No. 2016-237075, filed on Dec. 6, 2016, the entire contents of which are incorporated herein by reference.

BACKGROUND OF THE INVENTION

Field of the Invention

The present invention relates to a vehicle body structure with an ornamental member attached to a vehicle door.

Description of the Related Art

FIG. 6 of Japanese Patent Laid-Open No. 2012-218648 shows a structure in which the ornamental component (door lower garnish) of a vehicle door is arranged along a side sill (door opening frame portion). The door is formed by an outer panel and an inner panel. According to the structure of patent literature 1, the ornamental component is fixed to the outer panel by fasteners (screws). The fasteners can be accessed from the inner panel side via openings formed in the inner panel.

Such an ornamental component may be damaged by, for example, contact with a curb when opening the door or collision with a stone hit during driving. For this reason, the ornamental component is sometimes required to be detached for maintenance (repair or exchange) of the ornamental component.

In the structure of Japanese Patent Laid-Open No. 2012-218648, a predetermined number of openings need to be formed in the inner panel of the door in consideration of the above-described maintenance. This may lead to a complex door structure and a consequent decrease in the rigidity of the door and an increase in the manufacturing cost.

SUMMARY OF THE INVENTION

It is an object of the present invention to decrease the number of openings for maintenance provided in a door concerning an ornamental component for a vehicle door.

One of the aspects of the present invention provides a vehicle body structure including an ornamental member attached to an outer surface of an outer edge portion of a door, wherein the ornamental member includes an attachment portion pasted to the outer surface by a pasting unit, and a parallel surface that extends from the attachment portion outward with respect to the outer edge portion and is parallel to the outer surface.

Further features of the present invention will become apparent from the following description of exemplary embodiments with reference to the attached drawings.

DESCRIPTION OF THE EMBODIMENTS

An embodiment of the present invention will now be described with reference to the accompanying drawings. Note that the drawings are schematic views showing the structure or arrangement according to the embodiment, and the sizes of illustrated members do not necessarily reflect actual sizes.

(Vehicle Body Structure)

Figure 1:
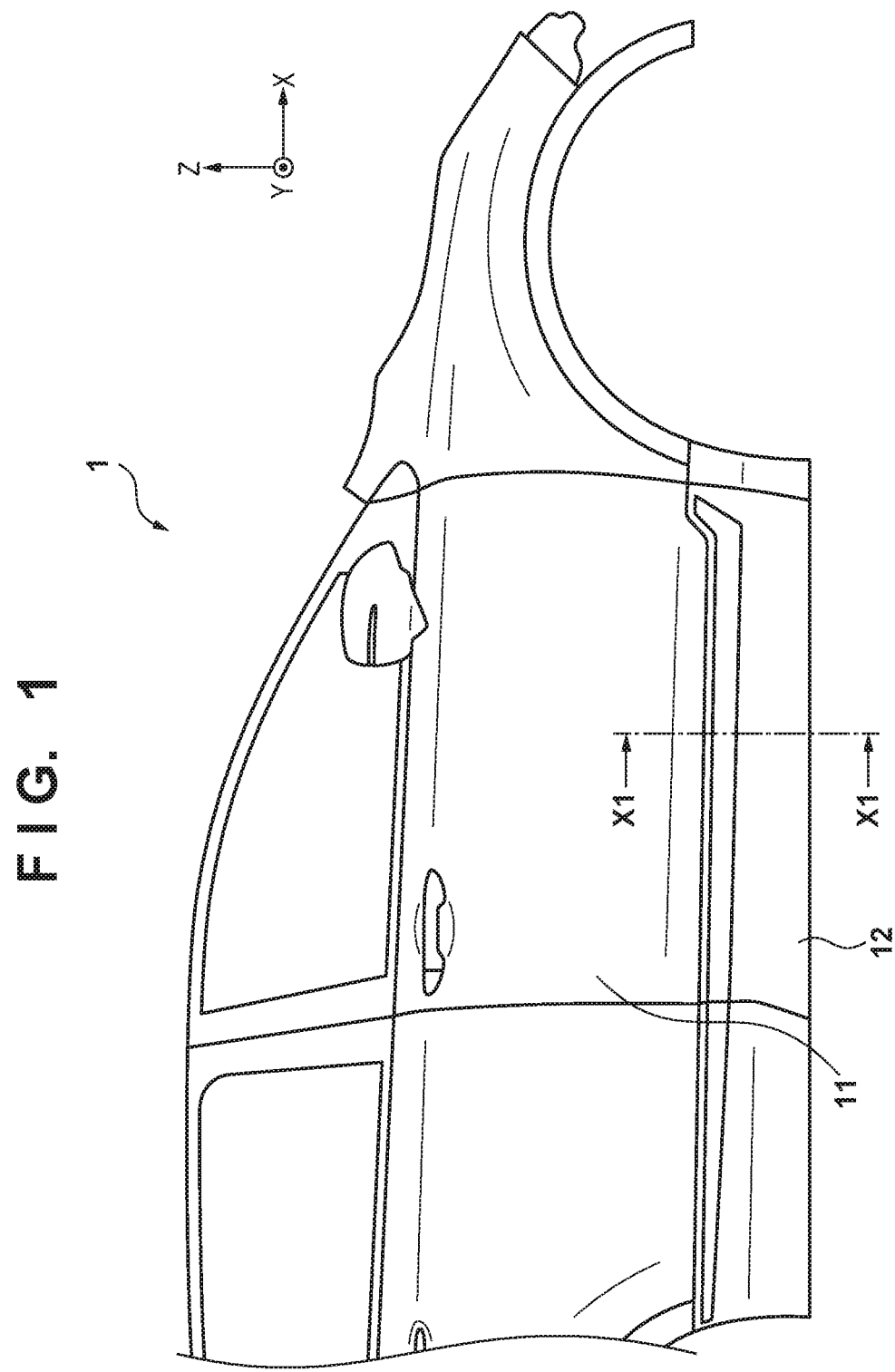
FIG. 1 is a view for explaining an example of a vehicle body structure.

FIG. 1 shows the right side view of a vehicle body structure 1. The vehicle body structure 1 includes a right front door 11. An ornamental member 12 is attached to the outer surface of an outer edge portion of the door 11. In this embodiment, the ornamental component 12 is a door lower garnish attached to the outer surface of the lower edge portion of the door 11. However, the following description is also applicable to another ornamental member attached to the upper edge portion, front edge portion, or rear edge portion of the door 11. Note that elements and components (for example, a wheel and the like) little related to the following explanation are not illustrated in FIG. 1.

For easy understanding of the structure, an x-axis, a y-axis, and a z-axis, which are orthogonal to each other, are shown in FIG. 1 (this also applies to the other drawings). The X direction corresponds to the vehicle longitudinal direction, the Y direction corresponds to the vehicle width direction, and the Z direction corresponds to the vehicle height direction. In this specification, expressions such as "front", "rear", "upper", and "lower" represent relative positional relationships. For example, expressions such as "front" and "front side" correspond to the +X direction, and expressions such as "rear" and "rear side" correspond to the −X direction. In addition, expressions such as "right" and "right side" correspond to the +Y direction, and expressions such as "left" and "left side" correspond to the −Y direction. Also, expressions such as "upper" and "upper side" correspond to the +Z direction, and expressions such as "lower" and "lower side" correspond to the −Z direction.

(Structure of Ornamental Component)

Figure 2:
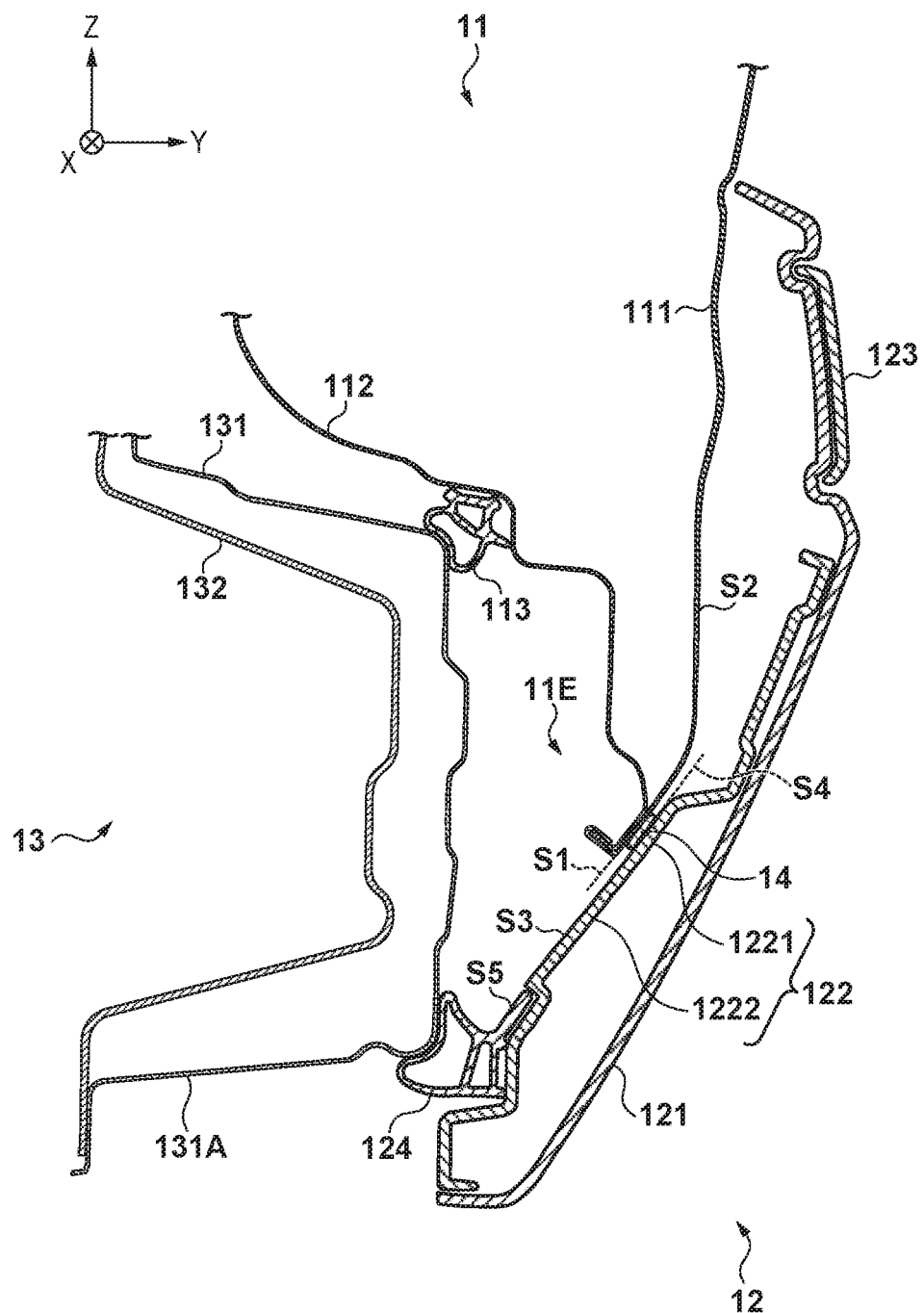
FIG. 2 is a view for explaining an example of the structure of an ornamental member.

FIG. 2 is a cut end view taken along a line X1-X1 in FIG. 1, and shows a structure in a state in which the door 11 is closed. The door 11 includes an outer panel 111 and an inner panel 112 joined to the outer panel 111. In this embodiment, the outer panel 111 and the inner panel 112 overlap each other at an outer edge portion 11E of the door 11 and are joined by hemming at the distal ends. Note that a reinforcing member (stiffener) (not shown) is arranged between the outer panel 111 and the inner panel 112.

An outer surface S1 (in this embodiment, the outer surface of the lower edge portion of the outer panel 111) of the outer edge portion 11E of the door 11 tilts with respect to the Z direction. Above the surface S1, the outer surface of the outer panel 111 forms a surface S2 that is vertical as compared to the surface S1. That is, the tilt angle of the surface S2 is smaller than that of the surface S1.

FIG. 2 shows a side sill (door opening frame portion) 13 as a part of the vehicle body. The side sill 13 includes a side sill outer 131 and a side sill inner 132. Note that a reinforcing member (not shown) is arranged between the side sill outer 131 and the side sill inner 132. The inner panel 112 is provided with a seal member 113 above the outer edge portion 11E. In a state in which the door 11 is closed, the seal member 113 abuts against the upper corner of the side sill outer 131.

The ornamental member 12 includes an outer member 121 (garnish outer), an inner member 122 (garnish inner) fixed to the lower portion of the outer member 121 from the inside of the vehicle, and an attached member 123 fixed to the upper portion of the outer member 121 from the outside of the vehicle. The members 121 to 123 are made of a resin (for example, polypropylene), and some or all of them may be plated or colored in accordance with the color of the vehicle body 13.

In the ornamental member 12, the inner member 122 includes an attachment portion 1221 and an extending portion 1222. The ornamental member 12 is attached at the attachment portion 1221 to the outer surface S1 of the outer edge portion 11E by a pasting member 14. In this embodiment, the pasting member 14 is an industrial double-sided adhesive tape. However, any adhesive material or adhesive with viscosity is usable.

The extending portion 1222 includes a parallel surface S3 that extends from the attachment portion 1221 outward (a position apart from the outer edge portion 11E) with respect to the outer edge portion 11E and is parallel to the outer surface S1. Here, "parallel" can be "substantially parallel" and represents a positional relationship in which an angle made by two surfaces falls within the range of 0° to 5° (preferably 0° to 3°). The parallel surface S3 tilts with respect to the Z direction to be located inside the vehicle as it separates from the outer edge portion 11E (to the lower side).

The attachment portion 1221 includes an attachment surface S4 that is in contact with the pasting member 14. In this embodiment, the parallel surface S3 and the attachment surface S4 are connected to each other so as to form the same surface. A step that does not make the outer panel 111 and the inner member 122 interfere may be provided between the parallel surface S3 and the attachment surface S4. For example, the attachment surface S4 may be recessed with respect to the parallel surface S3. In this case, the step amount of the recess is made smaller than at least the thickness of the pasting member 14. Alternatively, a three-dimensional shape may be formed on the attachment surface S4 by a surface treatment to improve the adhesive force of the pasting member 14. In this case, the step amount of the three-dimensional shape is made smaller than at least the thickness of the pasting member 14.

A seal member 124 is provided at a position (in this embodiment, under the extending portion 1222) apart from the extending portion 1222 of the inner member 122 outward with respect to the outer edge portion 11E. In a state in which the door 11 is closed, the seal member 124 abuts against the lower corner of the side sill outer 131. As is apparent from FIG. 2, in a state in which the door 11 is closed, the outer edge portion 11E is sealed by both the seal members 113 and 124 (that is, invisible from both the inside and the outside of the vehicle), and the surface S3 faces the side sill 13. The seal member 124 includes a continuous surface S5 that continues to the parallel surface S3, as will be described later in detail.

Note that as for the ornamental member 12, in this embodiment, the outer member 121 and the inner member 122 are individually formed and fastened to each other by fasteners (screws or the like) (not shown). However, the structure of the ornamental member 12 is not limited to this embodiment. For example, as another example, the outer member 121 and the inner member 122 may be integrally formed such that the connecting portion becomes thin, and one of them may be processed by folding at the connecting portion to form the ornamental member 12. Note that according to this example, deformation (so-called spring back) may occur due to the folding. However, according to this embodiment, this deformation can be prevented.

A corrosion-proofing or rustproofing coat layer 131A is formed on the bottom portion of the vehicle body, in particular, on the lower surface of the side sill 13 (the outer surface of the side sill outer 131). The coat layer 131A is formed to overlap the seal member 124 when the door 11 is closed. That is, the upper end of the coat layer 131A is located at or above a position to overlap the seal member 124. This can prevent rusting caused by, for example, water splashed from the ground during driving (in a state in which the door 11 is closed). Note that the coat layer 131A need only be provided up to a position to overlap at least the seal member 124, and need not be provided up to a position to overlap the seal member 113 above it.

Figure 3A:
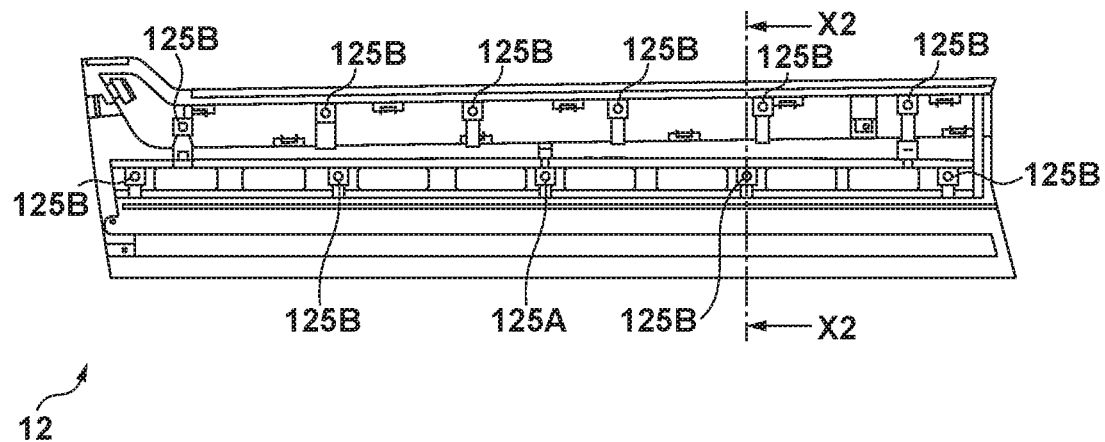
FIG. 3A is a view for explaining an example of the structure of the ornamental member.
Figure 3B:
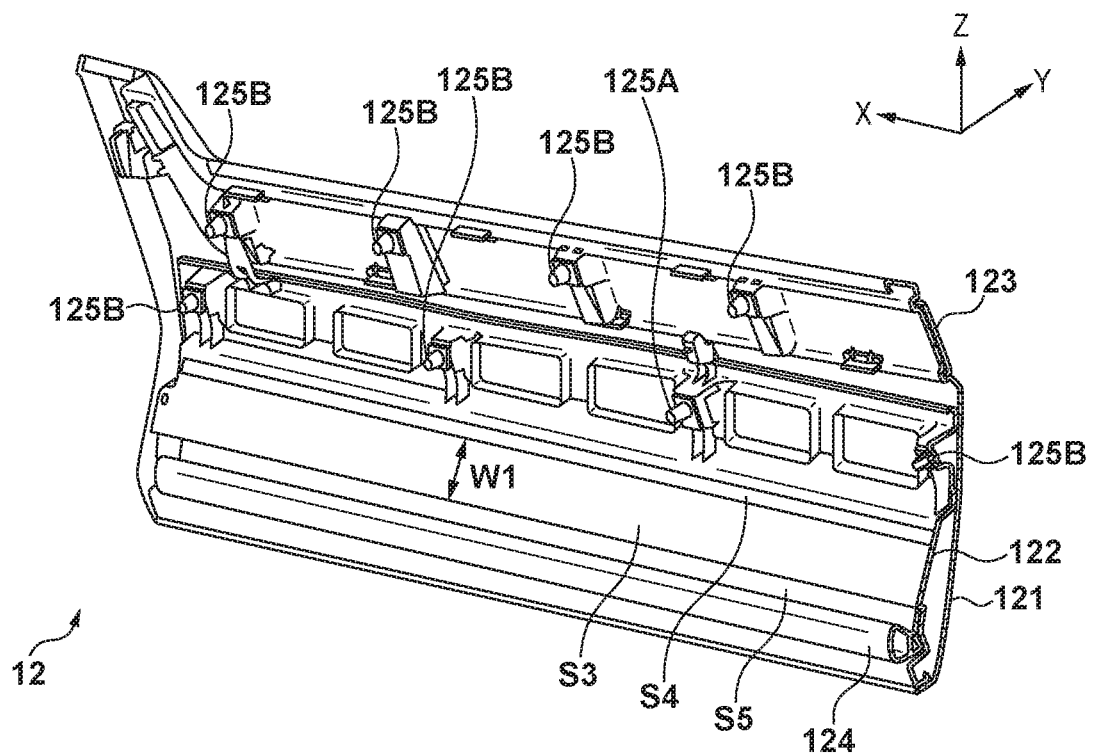
FIG. 3B is a view for explaining an example of the structure of the ornamental member.

FIG. 3A is a perspective view of the ornamental member 12 in a state before it is attached to the door 11. FIG. 3B is a perspective view showing a sectional structure taken along a line X2-X2 in FIG. 3A. The ornamental member 12 includes a plurality of fixing portions 125 (125A or 125B) to be fixed to the outer panel 111 of the door 11.

The fixing portions 125 are provided on each of the outer member 121 and the inner member 122. In this embodiment, the ornamental member 12 includes a total of 11 fixing portions 125. The outer member 121 is provided with six fixing portions 125, and under these, the inner member 122 is provided with five fixing portions 125.

Fixing of each fixing portion 125 is implemented by fixing using a tapping screw (indicated by the fixing portion 125A in FIG. 3A) or fixing using a clip with a smaller fixing force (indicated by the fixing portion 125B in FIG. 3A). In this embodiment, only one of the plurality of fixing portions 125 at the center of the inner member 122 is fixed by fixing using a tapping screw (fixing portion 125A), and the remaining fixing portions are fixed by fixing using clips (fixing portions 125B). For this reason, the inner panel 112 of the door 11 needs to have only one opening to access the fixing portion 125A. The number of openings can be decreased as compared to a case in which all the plurality of fixing portions 125 are fixed by fixing using tapping screws.

In addition, when some (in this embodiment, one) of the plurality of fixing portions 125 are fixed by fixing using tapping screws (fixing portion 125A), and the remaining portions are fixed by fixing using clips with a relatively small fixing force (fixing portions 125B), the influence of thermal expansion/contraction of the ornamental member 12 is reduced. For example, a portion where a position shift between the members caused by the thermal expansion/contraction needs to be prevented (more specifically, a portion that interferes with another member (for example, another door) of the vehicle body at a high possibility due to the thermal expansion/contraction or a vicinity thereof) is fixed by a tapping screw, and the remaining portions are fixed by clips.

Referring back to FIG. 2, the outer panel 111 includes the tilting surface S1 and the surface S2 connected to the surface S1 and having a tilt angle smaller than that of the surface S1. In this embodiment, the ornamental member 12 is fixed to the outer panel 111 by the pasting member 14 in the surface S1, and fixed by the plurality of fixing portions 125 (125A or 125B) in the surface S2. As described above, the parallel surface S3 parallel to the surface S1 tilts to be located inside the vehicle as it separates from the outer edge portion 11E. For this reason, even if the ornamental member 12 is formed to be thick particularly in the lower portion, it is possible to suppress an increase in the vehicle width and simultaneously ensure the rigidity of the ornamental member 12.

Referring to FIG. 3B, in the inner member 122, a width W1 of the parallel surface S3 of the extending portion 1222 (the distance from the end on the side of the attachment surface S4 to the end on the side of the seal member 124) is set to be equal to or larger than the length of a general long tool such as a cutter. Accordingly, when detaching, from the outer edge portion 11E, the ornamental member 12 (see FIG. 2) attached to the outer edge portion 11E of the door 11, the pasting member 14 can be accessed from the parallel surface S3 by the long tool. More specifically, in a state in which the door 11 is open, the pasting member 14 is cut by inserting the long tool between the surface S1 and the surface S4 from the parallel surface S3. From this viewpoint, the extending portion 1222 functions as a guide portion that guides the long tool used to cut the pasting member 14.

(Shape of Seal Member Under Ornamental Member)

Figure 4A:
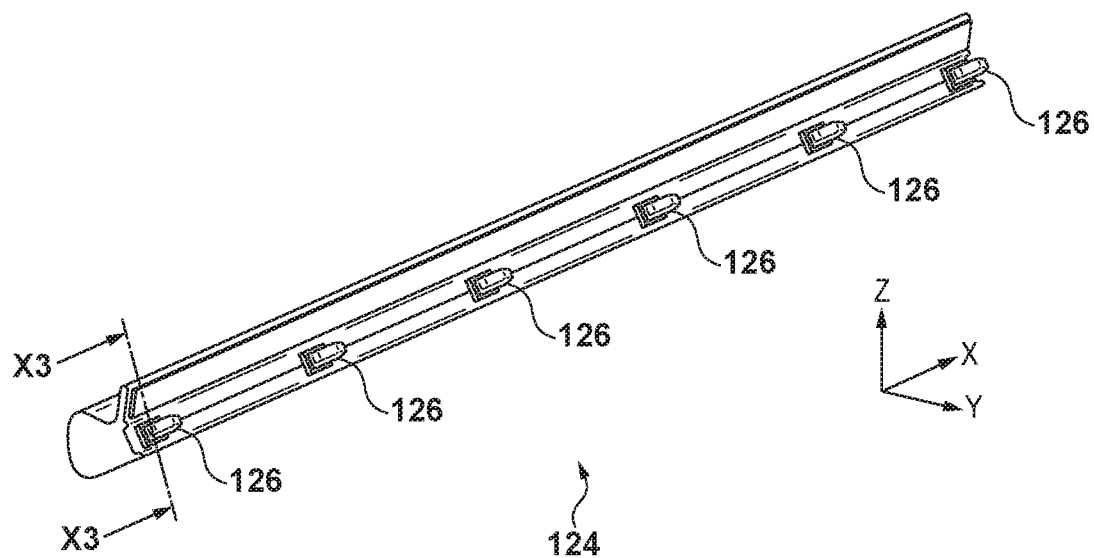
FIG. 4A is a view for explaining an example of the structure of the seal member of the ornamental member.
Figure 4B:
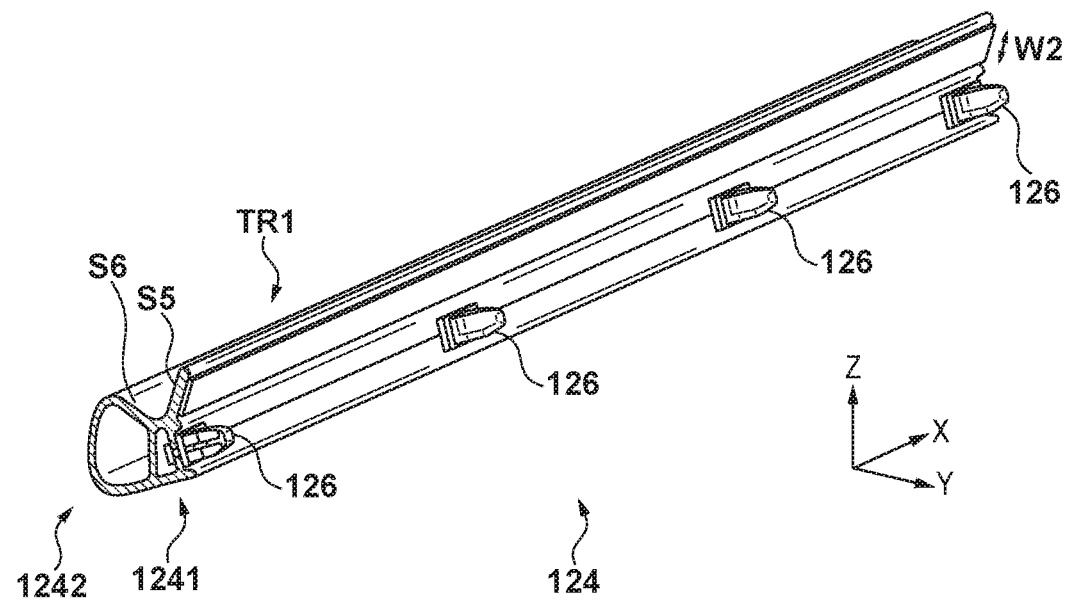
FIG. 4B is a view for explaining an example of the structure of the seal member of the ornamental member.

FIG. 4A is a perspective view of the seal member 124 in a state before it is fixed to the ornamental member 12. FIG. 4B is a perspective view showing a sectional structure taken along a line X3-X3 in FIG. 4A. The seal member 124 is provided with a plurality of fixing portions 126. The seal member 124 is fixed to the lower portion of the parallel surface S3 of the inner member 122 by the plurality of fixing portions 126. In this embodiment, each fixing portion 126 is fixed by a clip.

As shown in FIG. 4B, the seal member 124 includes a base portion 1241 and a seal portion 1242. The base portion 1241 is a portion on a side to be fixed to the inner member 122 of the ornamental member 12. The plurality of fixing portions 126 described above are provided at a predetermined interval on the base portion 1241. The seal portion 1242 is a portion on a side to abut against the side sill outer 131 of the side sill 13. The seal portion 1242 is formed integrally with the base portion 1241 so as to be hollow.

Referring to FIG. 2 in addition to FIG. 4B, the seal member 124 includes the continuous surface S5, as described above. The continuous surface S5 is formed on the base portion 1241. In a state in which the seal member 124 is fixed to the ornamental member 12 at the base portion 1241, the continuous surface S5 continues to the parallel surface S3. That is, the continuous surface S5 is formed side by side with the parallel surface S3 of the inner member 122 so as to be flush with the parallel surface S3. Hence, even if the width W1 of the parallel surface S3 is smaller than assumed, more specifically, even if the length of the above-described long tool is larger than the width W1, the long tool can easily access the pasting member 14 because of a width W2 of the continuous surface S5.

The seal member 124 also includes a tilting surface S6 that tilts with respect to the Z direction. The tilting surface S6 is formed on the seal portion 1242 and extends from an end of the continuous surface S5 toward the inside of the vehicle so as to form a trench TR1 with the continuous surface S5. Accordingly, as is apparent from FIG. 2, the seal member 124 can abut against the vehicle body 13. Particularly, in this embodiment, since the ornamental member 12 is attached to the lower edge portion of the door 11, rainwater that has flowed in when opening/closing the door 11 can be collected in the trench TR1. Even if the rainwater freezes, the door 11 can be opened/closed.

Summary of Embodiment

According to the first aspect, there is provided a vehicle body structure (for example, 1) including an ornamental member (for example, 12) attached to an outer surface (for example, S1) of an outer edge portion (for example, 11E) of a door (for example, 11), wherein the ornamental member includes an attachment portion (for example, 1221) pasted to the outer surface by a pasting unit, and a parallel surface (for example, S3) that extends from the attachment portion outward with respect to the outer edge portion and is parallel to the outer surface.

According to the first aspect, since the pasting unit can be accessed from the parallel surface using a long tool such as a cutter, it is possible to decrease the number of openings for maintenance provided in the door concerning the ornamental component. Accordingly, the door structure can be simplified, resulting in an advantage in improving the rigidity of the door and reducing the manufacturing cost.

According to the second aspect, the attachment portion (for example, 1221) includes a surface (for example, S4) that continues to the parallel surface (for example, S3) and is parallel to the outer surface.

According to the second aspect, it is possible to access the pasting unit from the parallel surface using a long tool such as a cutter and smoothly cut the pasting unit.

According to the third aspect, the parallel surface (for example, S3) tilts to be located inside a vehicle as the parallel surface separates outward from the outer edge portion (for example, 11E) of the door (for example, 11).

According to the third aspect, it is possible to thicken the ornamental member while suppressing an increase in the vehicle width and ensure the rigidity of the ornamental member.

According to the fourth aspect, the ornamental member (for example, 12) is provided with a seal member (for example, 124) at a position farther apart outward from the outer edge portion (for example, 11E) than the parallel surface (for example, S3), the seal member includes a base portion (for example, 1241) on a side of the ornamental member and a seal portion (for example, 1242) that forms a seal to a vehicle body, and the base portion includes a continuous surface (for example, S5) that continues to the parallel surface.

According to the fourth aspect, when accessing the pasting unit from the parallel surface using a long tool such as a cutter, the seal member need not be detached from the ornamental component. Hence, the ornamental component can easily be detached, resulting in an advantage in making maintenance of the ornamental component.

According to the fifth aspect, a trench (for example, TR1) is formed between the base portion (for example, 1241) and the seal portion (for example, 1242) of the seal member (for example, 124).

According to the fifth aspect, the seal member is allowed to abut against the vehicle body. In addition, if the ornamental member is a door lower garnish, rainwater can be collected in the trench formed by the tilting surface and the continuous surface. Even if the rainwater freezes, the door can be opened/closed.

According to the sixth aspect, the ornamental member (for example, 12) is attached to a lower edge portion of the door, a corrosion-proofing coat layer (for example, 131A) is formed on a bottom portion of the vehicle body (for example, 13), and the coat layer is formed to overlap the seal member (for example, 124) when the door is closed.

According to the sixth aspect, it is possible to prevent rusting caused by, for example, water splashed from the ground.

According to the seventh aspect, there is provided an ornamental member (for example, 12) for a vehicle door (for example, 11), wherein the ornamental member is attached to an outer surface (for example, S1) of an outer edge portion (for example, 11E) of the door, and the ornamental member includes an attachment portion (for example, 1221) pasted to the outer surface by a pasting unit (for example, 14), and a parallel surface (for example, S3) that extends from the attachment portion outward with respect to the outer edge portion and is parallel to the outer surface.

According to the seventh aspect, since the pasting unit can be accessed from the parallel surface using a long tool such as a cutter, it is possible to decrease the number of openings for maintenance provided in the door concerning the ornamental component. Accordingly, the door structure can be simplified, and a decrease in the rigidity of the door and an increase in the manufacturing cost can be prevented.

According to another aspect, the door (for example, 11) includes an outer panel (for example, 111) and an inner panel (for example, 112) joined to the outer panel. The ornamental member (for example, 12) includes a plurality of fixing unit (for example, 125) to be fixed to the outer panel. Some (for example, 125A) of the plurality of fixing units are fixed by fixing using tapping screws, and some (for example, 125B) of the remaining fixing units are fixed by fixing using clips.

According to this aspect, detachment is easy as compared to a case in which all the fixing units to the outer panel are fixed by fixing using tapping screws. In addition, when some fixing units are fixed by fixing using tapping screws, and the remaining portions are fixed by fixing using clips with a relatively small fixing force, the influence of thermal expansion/contraction of the ornamental member can be reduced. For example, a portion of higher priority (more specifically, a portion that needs to avoid interference with another member (for example, another door) of the vehicle body or a vicinity thereof) is fixed by a tapping screw, and the remaining portions are fixed by clips.

According to still another aspect, the outer panel (for example, 111) includes a first surface (for example, S1) that tilts with respect to the height direction (for example, the Z direction) of the vehicle body at the outer edge portion (for example, 11E), and a second surface (for example, S2) connected to the first surface and having a tilt angle smaller than that of the first surface. The ornamental member is fixed by the pasting member (for example, 14) in the first surface, and fixed by the plurality of fixing units (for example, 125) in the second surface.

According to this aspect, it is possible to thicken the ornamental member while suppressing an increase in the vehicle width and ensure the rigidity of the ornamental member.

(Others)

Several preferred embodiments have been described above. However, the present invention is not limited to these examples and may partially be modified without departing from the scope of the invention. Individual terms described in this specification are merely used for the purpose of explaining the present invention, and the present invention is not limited to the strict meanings of the terms and can also incorporate their equivalents.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-237075, filed on Dec. 6, 2016, which is hereby incorporated by reference herein in its entirety.

What is claimed is:

1. A vehicle body structure including a door and an ornamental member attached to an outer surface of an outer edge portion of the door,
    wherein the ornamental member includes an inner member and an outer member, the inner member includes:
        an attachment portion pasted to the outer surface by a pasting unit; and
        an extending portion that extends from the attachment portion beyond the outer edge portion, the extending portion including a parallel surface which is parallel to the outer surface.

2. The structure according to claim 1, wherein the attachment portion includes a surface that continues to the parallel surface and is parallel to the outer surface.

3. The structure according to claim 1, wherein the parallel surface tilts to be located toward a vehicle interior as the parallel surface extends away from the outer edge portion of the door.

4. The structure according to claim 1, wherein the ornamental member is provided with a seal member at a position farther apart outward from the outer edge portion than the parallel surface,
    the seal member includes a base portion on a side of the ornamental member and a seal portion that forms a seal to a vehicle body, and
    the base portion includes a continuous surface that continues to the parallel surface.

5. The structure according to claim 4, wherein a trench is formed between the base portion and the seal portion of the seal member.

6. The structure according to claim 4, wherein the ornamental member is attached to a lower edge portion of the door,
    a corrosion-proofing coat layer is formed on a bottom portion of the vehicle body, and
    the coat layer is formed to overlap the seal member when the door is closed.

* * * * *